(12) United States Patent
Hsieh

(10) Patent No.: US 6,487,148 B1
(45) Date of Patent: Nov. 26, 2002

(54) EDGE DETECTION FOR SERVO SIGNALS IN OPTICAL STORAGE SYSTEM

(75) Inventor: Yung-Chieh Hsieh, San Jose, CA (US)

(73) Assignee: Terastor Corp., San Jose, CA (US)

( * ) Notice: Subject to any disclaimer, the term of this patent is extended or adjusted under 35 U.S.C. 154(b) by 0 days.

(21) Appl. No.: 09/368,544

(22) Filed: Aug. 4, 1999

(51) Int. Cl.$^7$ ................................................ G11B 7/00
(52) U.S. Cl. ................. 369/47.1; 369/59.21; 369/59.12
(58) Field of Search ......................... 369/44.11, 44.13, 369/44.23, 44.27, 44.28, 44.34, 44.41, 47.1, 47.27, 47.35, 53.1, 59.1, 59.13, 59.21, 59.12, 59.11, 59.19, 59.23

(56) References Cited

U.S. PATENT DOCUMENTS 5,768,219 A * 6/1998 Yamamoto et al. ...... 369/13.24

* cited by examiner

*Primary Examiner*—Muhammad Edun
(74) *Attorney, Agent, or Firm*—Fish & Richardson P.C.

(57) ABSTRACT

An edge detection system for detecting pre-formatted marks on a disk surface using reflected beams of optical signals. The detector include at least two separate sensing areas to analyze the energy distribution of the reflected beam to generate an edge detecting signal.

14 Claims, 6 Drawing Sheets

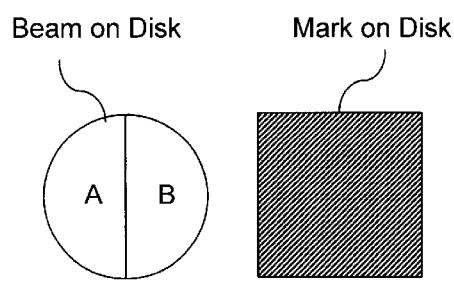
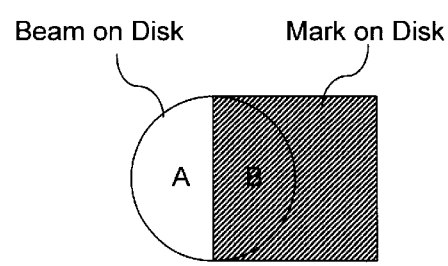
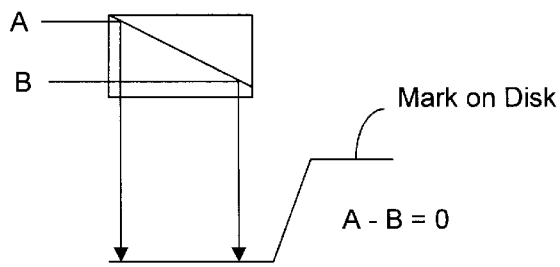
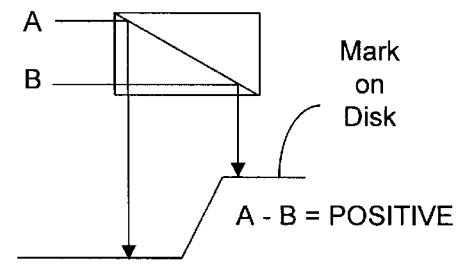
FIG. 2A  FIG. 2B

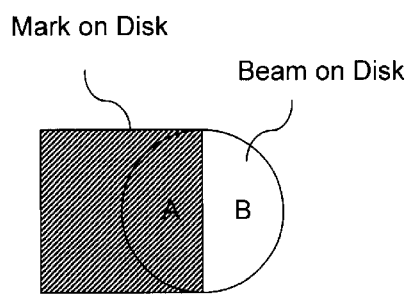
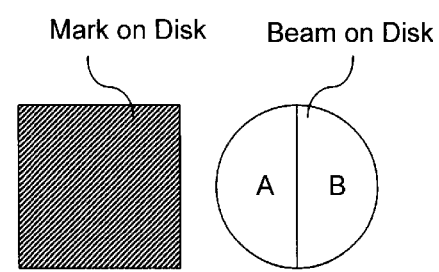
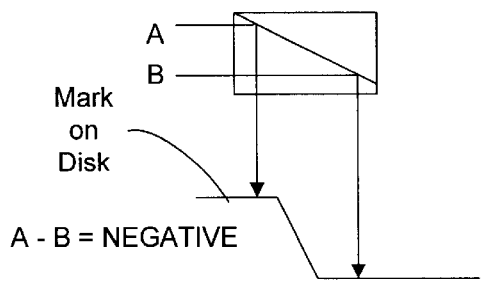
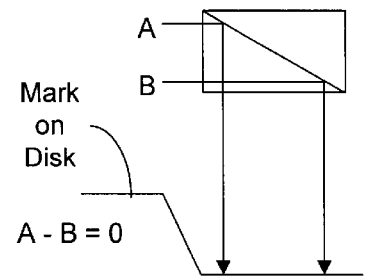
FIG. 2C            FIG. 2D

EDGE DETECTION FOR SERVO SIGNALS IN OPTICAL STORAGE SYSTEM

BACKGROUND

The present specification generally relates to detecting marks on disk surfaces for servo signals.

An optical disk drive uses a laser beam to write and read data on a storage media. The disk drive uses the same laser beam to read the servo signals, including a tracking error signal (TES) and read-only (RO) signals. The TES may be generated by detecting a diffraction pattern of light from pre-formatted areas, e.g. grooves on a disk surface. The TES provides information about the laser beam position on a grooved disk. The TES is fed into a control system to keep the illuminated beam aligned relative to the center of a selected track. It is desirable to keep the beam on the center if the data is recorded on the center of the track.

The RO signals mainly provide address information for the disk surface, such as a sector number and a track number. The RO signals are encoded in the pre-formatted marks on the disk surface. Since the reflectivity of the pre-formatted mark is different from the reflectivity of the flat region, pre-formatted marks can be detected by measuring a sum signal, which is the total amount of light reflected from the disk surface, and then by electronically performing differentiation of the sum signal. If the sum signal is below (or above) a predetermined level, it indicates that a focused spot of the laser beam is crossing a mark. If the sum signal is above (or below) the predetermined amount, then it indicates the focused spot being on a flat area. The encoded RO signals are decoded by successively measuring the sum signal as the laser beam scans over a series of pre-formatted marks.

SUMMARY

A near-field optical disk drive operates by placing the optical head near the storage media by a spacing less than about one wavelength (e.g., a fraction of one wavelength). Unlike coupling in a far-field configuration based on light propagation, optical signals in the near-field configuration are coupled between the optical head and the storage media at least in part by the evanescent fields. Hence, each optical signal coupled through the optical head has a dependence on the air gap between the head and the media. Any variation in the air gap may cause a variation in an optical signal which acts as noise in signal detection.

The present disclosure provides an edge detection technique to generate a RO signal that is insensitive to the air gap spacing and the structure of the film stack in the media. The RO signal generated by this edge detection technique mainly changes with the edge geometry of the pre-formatted marks on the media and is decoupled from other optical signals including the data-bearing signal (e.g., the magneto-optic signal or the phase-change signal) and the TES signal. Hence, the structure of the media can be optimized for data recording and reading without significantly compromising generation of servo signals.

The inventor noticed that accurate timing of the pre-formatted mark edges can be detected, preferably without performing any electronic differentiation of the total reflected energy, by simply measuring the spatial energy distribution of the reflected beam. The pre-formatted mark edges can be accurately detected even under the high variation of the head[0a‰d]edia spacing often encountered in near-field readout situation by monitoring the energy difference between the two halves of the reflected laser beam. Since the energy distributions in the two halves vary together with the signal variations caused by the head-media spacing, the film structure, and other common-mode factors, the energy difference between the two halves changes primarily with the geometry of the media surface changes and rejects common-mode noise.

In one aspect, the present specification involves an edge detection system for detecting pre-formatted marks on a disk surface by analyzing the energy distribution of a laser beam reflected from the disk surface. In some embodiments, analysis of the energy distribution includes receiving the laser beam and optically differentiating the energy from the two halves separated by a line in a selected direction to generate an edge detecting read-only (RO) signal.

In another aspect, a disk drive system including an edge detection system is disclosed. One embodiment of the disk drive system includes an optical head that couples the laser beam onto the surface of the storage media. The system also includes a servo detector have two sensing areas to detect energy distributions from two different portions of the laser beam and an edge detection analyzer that computes the difference between the portions.

BRIEF DESCRIPTION OF THE DRAWINGS

These and other aspects will be described in reference to the accompanying drawings wherein:

FIGS. 2A–2D illustrate different processes of detecting the pre-formatted mark using the edge detection system, where the top part of each figure shows the relative position of a mark on disk and the beam spot on the disk from a point of view on top of the disk and the bottom part shows a corresponding side view;

DETAILED DESCRIPTION

The present disclosure describes an edge detection system for servo signals that detects pre-formatted marks on an optical disk surface. The system detects the pre-formatted marks by illuminating the disk surface with a focused beam of light and measuring the energy difference between two halves of the returned beam along a selected direction across the beam. The energy difference is close to zero when the entire beam symmetrically illuminates a mark or a location between the two adjacent marks. Otherwise, the energy difference is non-zero when the beam is illuminating a feature on the disk surface in an asymmetrical manner, e.g., the beam aiming at the edge of a mark. This technique can be used in optical disk drives in both a far-field configuration where the optical head coupled optical energy to and from the disk by a distance much greater than one wavelength and a near-field configuration where the head-disk spacing is less than one wavelength (e.g., a fraction of one wavelength).

Figure 1:
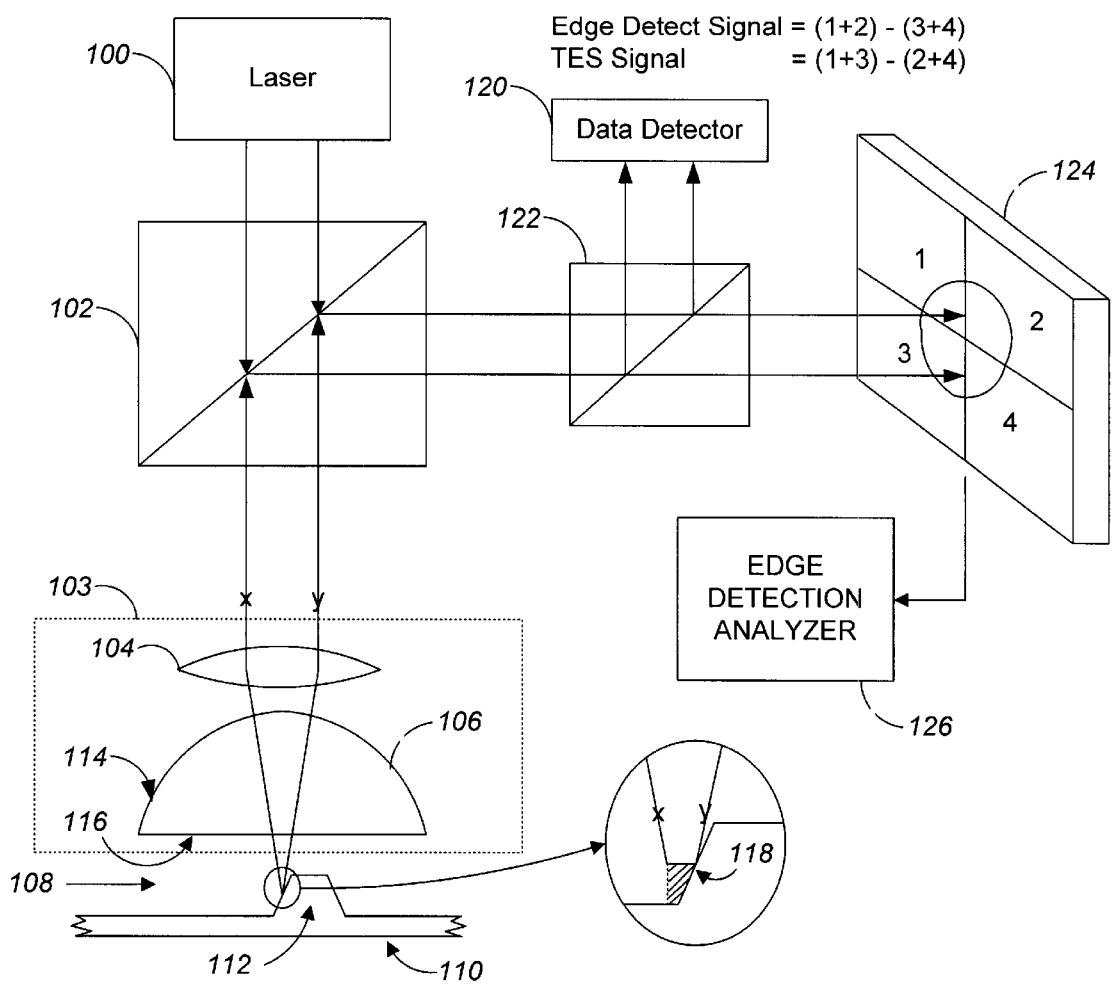
FIG. 1 illustrates one embodiment of an optical disk drive system using an edge detection system, where an insert further shows a detail diagram of a beam spot covering an edge of a pre-formatted mark.

FIG. 1 is one embodiment of an optical disk drive system using an edge detection method. The edge detection method is used to detect the servo signals. A source of optical radiation, such as a laser 100, generates an optical beam. An optical head 103 receives and focuses the beam onto a preformatted storage disk 110 via an air-gap 108. The optical head 103 may be specially constructed to provide evanescent coupling for operation under the near-field configuration. For example, the optical head 103 may include an objective lens 104 and a near-field lens 106, where the near-field lens 106 has a flat surface facing the disk 110. In some embodiments, the nearfield lens may be solid immersion lens (SIL) 106 which has a spherical surface 114 facing the objective lens 104 and a flat surface 116 substantially parallel to the disk 110. The optical head 103 may also use a solid immersion mirror (SIM), a tapered optical fiber, or a flying diode laser to provide the near-field coupling through evanescent fields.

The laser beam passes through the air-gap 108 between the SIL 106 and the disk 110, and couples into a storage media layer within the disk 110. The storage media may be a read-only type, a write-once-ready-many type, or a rewritable optical media (write-many-read-many) such as a magneto-optic media and a phase change optical media. In near-field recording, the disk drive system can be made to operate with the air-gap 108 less than one wavelength of the light to obtain a tightly focused beam spot at least in part by evanescent waves. The numerical aperture may be close to or greater than unity. Additional examples of the SIL and their operation are disclosed in U.S. patent application Ser. No. 08/846,916.

An optical disk may be pre-formatted with grooves or marks to provide various information, such as laser beam position and disk address information. The laser beam position is often used to extract track information, while the address information is used to compute sector numbers and track numbers.

In FIG. 1, an inset figure shows a focused spot illuminating an edge 118 of a pre-formatted mark 112. The beam reflected from the disk 110 is directed to a first beam splitter 102. The beam is then re-directed onto a servo-data beam splitter 122 that separates the light into two parts, one for a data detector 120 and the other for a servo detector 124. The data detector 120 detects and processes customer data. The servo detector 124 detects the servo signals, including the TES and the RO signals. The servo detector 124 may be a quadrant detector having four independent cells, each of which is called a quadrant. The detected servo signal is then sent to an edge detection analyzer 126 to be analyzed. The edge detection analyzer 126 processes the signals from the four individual light-sensing quadrant cells, 1 through 4, in servo detector 124 as the TES for providing tracking control or the RO signals for detecting address information.

If the RO signals are to be processed, the analyzer 126 monitors spatial distributions of energy from two groups of cells symmetrically arranged relative to each other along a line that is substantially perpendicular to images of tracking grooves in the reflected beam at the servo detector 124. The tracking grooves may be spiral or concentric grooves formed on the surface of a disk. The RO signal detects pre-formatted marks in a specified track which are spaced in an irregular interval to indicate addresses or sectors within that track. As illustrated in FIG. 1, the analyzer 126 groups quadrants into two groups, one group comprising quadrants 1 and 2 to detect a first spatial half of the reflected beam, and the another group comprising quadrants 3 and 4 to detect a second spatial half of the reflected beam.

To generate the RO signals, the analyzer 126 outputs $G[(1+2)-(3+4)]$ for an edge detecting signal, where G is a gain in the system. The processing is done optically as follows. When the focused spot is across the pre-formatted mark, the amount of light reflected into each of the four cells varies due to diffraction of the light from the mark edges and also due to the change in evanescent coupling between the bottom and the top of the pre-formatted mark.

The analyzer 126 monitors energy distributions from two different groups of cells in the servo detector 124 to generate the TES for tracking operation. The cells of servo detector 124 are divided into two groups along a direction substantially parallel to the images of the portion of tracking grooves illuminated by the beam. As shown in FIG. 1, quadrants 1 and 3 are combined to form a first light-sensing area and quadrants 2 and 4 are combined to form a second light-sensing area. Two interference patterns are generated from a diffraction grating formed by track marks of a regular interval along the radial direction of the disk. The track error signal is generated by detecting a difference between the sum of the quadrants 1 and 3 that receive one interference pattern and the sum of the quadrants 2 and 4 that receive another interference pattern. This difference can be used to keep the beam accurately on the intended track.

FIGS. 2A through 2D show one example of the mark detection process using the edge detection system 126. A focused beam with of two halves, A and B, illuminating, a flat region is shown in FIG. 2A. Under this condition, a detector receives the same amount of light from the two halves, A and B. Therefore, the differential output (A–B) of the RO channel is zero. The differential output (A–B) is also zero when the beam is centered at the top of a pre-formatted mark since the spatial patterns in the reflected beam received by the two halves of the servo detector 124 are symmetric. On the other hand, FIG. 2B shows the focused beam on the edge of the mark. The intensity distribution of the reflected beam becomes asymmetric (i.e. the two halves of the detector 124 receive different amount of energy). Depending on the surface feature of the pre-formatted mark edge and the thin film structure, the differential output can be positive or negative. FIG. 2C shows an opposite result with a falling edge. If the differential output of the rising edge was positive, the differential output of the falling edge must be negative, and vice versa. Finally, FIG. 2D shows the spot with both halves back on the flat surface.

Figure 3:
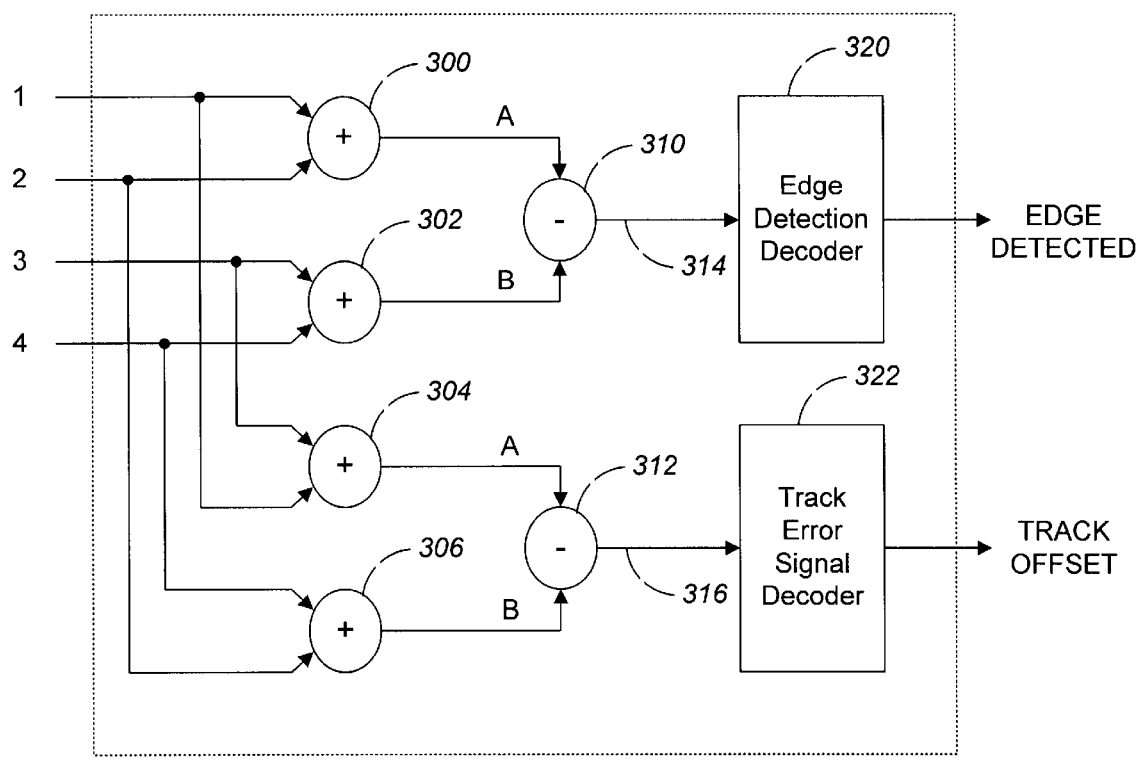
FIG. 3 is a block diagram of an edge detection analyzer.

FIG. 3 illustrates the above described function of the edge detection analyzer 126 in a block diagram. The quadrant signals are received and summed in different combinations. In a read-only (RO) channel 324, summing elements 300, 302 add two quadrants within each side, x or y, of the reflected beam. Two sums calculated by the summing elements 300, 302 are labeled as A and B. A differential element 310 subtracts the B side signal from the A side signal to get a difference signal 314 representing an edge detect signal. The difference signal 314 is directed to an edge detection decoder 320 to indicate that the mark edge has been detected. If a positive value represents the rising edge, then a negative value represents the falling edge, and visa versa, depending on the film stack.

The tracking error signal can be processed similarly in a track error signal (TES) channel 326. Summing elements 304, 306 add quadrant signals from the top and bottom sides of the reflected beam. Two sums calculated by the summing elements 304, 306 are labeled A' and B'. Another differential element 312 subtracts the B' signal from the A' signal to get a difference signal 316 representing the tracking error signal. The difference signal 316 is directed to a tracking error signal decoder 322 to determine the amount of track offset necessary to keep the beam at the center of the current track.

Figure 4:
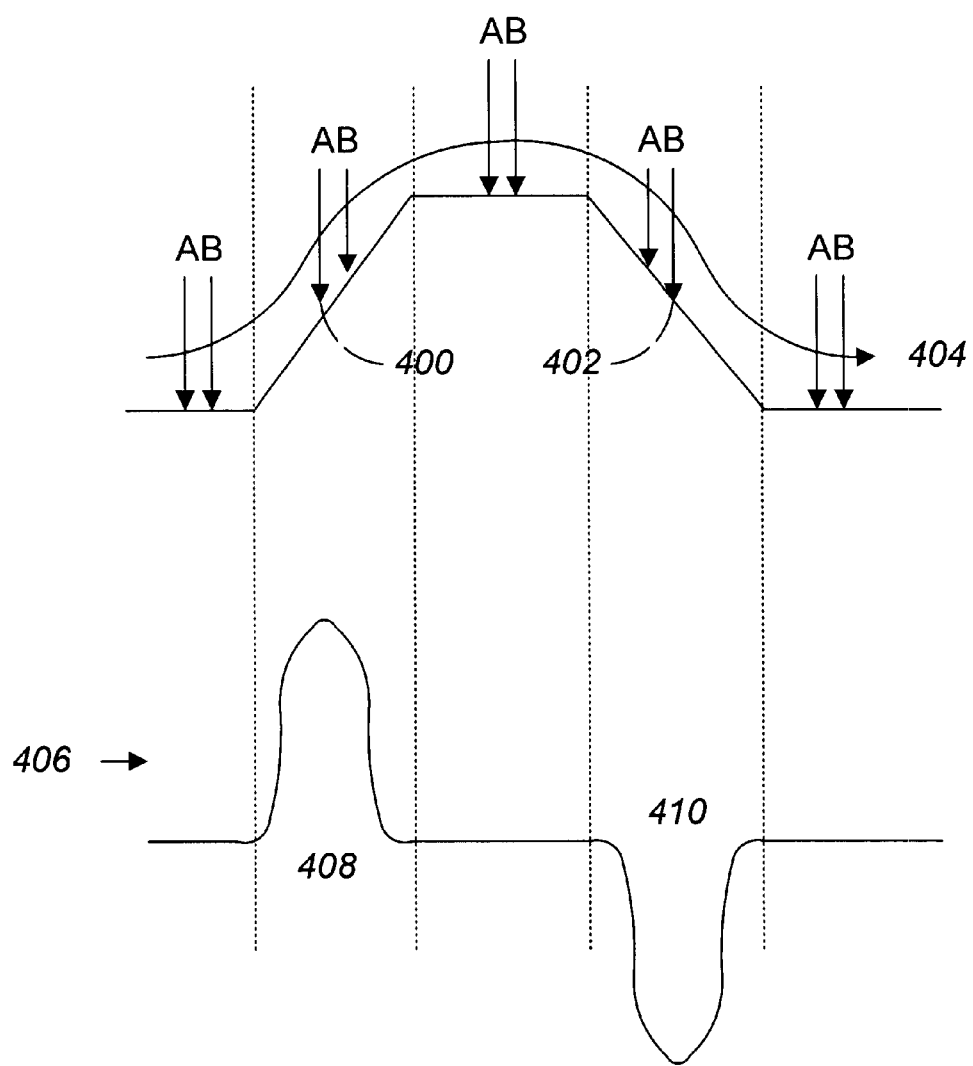
FIG. 4 is a curve showing energy differences calculated by the edge detection system as the focused beam moves across one of the pre-formatted marks for servo signal.

FIG. 4 shows the energy difference calculated by the edge detection system as the focused beam moves across one of the pre-formatted marks for the servo signal. The figure shows an optical disk surface with a pre-formatted mark and its two edges 400 and 402. As the disk surface is traced along a path 404 with the laser beam, the energy differences of the two halves of the return beam are computed as shown on a lower plot 406. In one embodiment, the rising edge 400 with a positive slope results in a positive difference with a positive curve 408. The falling edge with a negative slope indicates a negative difference with a negative curve 410. The above positive and negative signs may be reversed when the interference structure of the marks (e.g., the structure of the thin film stack).

Figure 5:
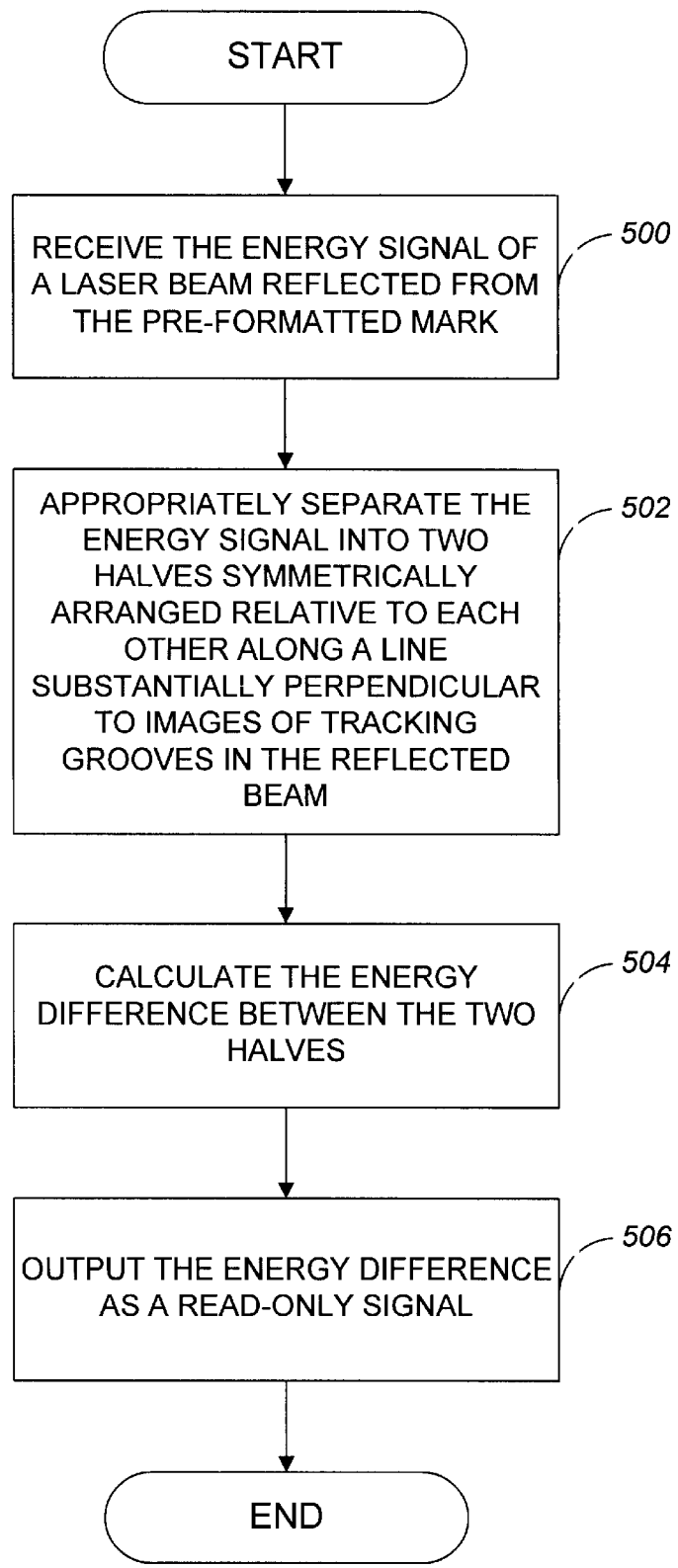
FIG. 5 is a flowchart of a near-field readout edge detection process for detecting and generating an RO signal.

A near-field readout edge detection process for detecting and generating an RO signal is shown in a flowchart (FIG. 5). The edge detection analyzer 126 receives the energy signal of a laser beam reflected from the pre-formatted mark at step 500. The analyzer 126 then separates the energy signal into two halves symmetrically arranged relative to each other along a line substantially perpendicular to images of tracking grooves in the reflected beam, at step 502, to calculate the energy difference between the two halves at step 504. The analyzer 126 outputs the energy difference as an RO signal at step 506.

There are several advantages to using the edge detection scheme, instead of the sum signal scheme, to decode the RO signals in near-field optical recording. For example, in nearfield recording, the edge detecting signal is a difference signal which varies little even during relatively high fly-height variation even though the signal received by each half of the servo detector 124 varies. Therefore, the edge detecting signal is much less dependent on the size of the air-gap between the near-field lens and the storage media. However, the sum signal is strongly dependent on the size of the air-gap. Any variation in the head-media spacing may cause a variation in the sum signal, which act as a noise in signal detection. In near-field optical recording, the difference signal also reduces a phase distortion caused by the evanescent fields and lens aberrations of the objective lens and the near-field lens.

The edge detecting signal is also relatively insensitive to a thin-film stack because any such variation is substantially eliminated by taking the difference between the signal from the two halves of the servo detector 124. In contrast, the sum signal is a strong function of the thin film stack in an optical data storage system. The film stack is designed mainly to optimize the performance of data reading capability. The film stack that optimizes the performance of data reading capability does not necessarily optimize the servo signals. Therefore, a signal that is highly dependent on the film stack is undesirable for reading servo signals.

Other advantages of the edge detection system include precise timing in the edge detection at all fly-heights, insensitivity to the focus depth, a high signal-to-noise ratio, and a simplified electronic processing and circuitry. The differentiation in edge detection scheme is done optically while the sum signals are differentiated electronically to calculate the total energy and locate edges of the pre-formatted marks. Therefore, the present technique essentially avoids the noise associated with the electronic differentiation of the sum signal. Also, the present technique allows for a high common-mode noise rejection ratio because the differentiation is taken optically rather than electronically. Since the energy difference calculation is substantially independent of the air-gap distance, a degradation in system performance due to fly height variability and roughness of media may be significantly reduced.

Although only a few embodiments have been described in detail above, those of ordinary skill in the art certainly understand that modifications are possible. For example, some versions of the edge detection analyzer described above are implemented in digital discrete components, in application specific integrated circuits (ASICs), in computer programs executed by programmable processors, or in some combination of these technologies. All such modifications are intended to be encompassed within the following claims, in which:

What is claimed is:

1. An edge detection system for detecting a pre-formatted mark on a disk surface by detecting a beam reflected from the disk surface, comprising:

an optical head configured to provide evanescent coupling for operation under a near-field configuration, where a spacing variation between the head and the disk surface is high, by receiving and focusing the beam onto the disk surface at a distance less than one wavelength of said beam;

a light detector operatively coupled with said optical head to receive the reflected beam, said light detector having a first input element that receives a first spatial half of a reflected beam from the disk surface having pre-formatted marks to produce a first signal, and a second input element that receives a second spatial half of said reflected beam to produce a second signal; and an edge detection analyzer coupled to said first and second input elements to produce a difference of said first and second signals to indicate a location with respect to a pre-formatted mark on the disk surface, where the difference of said first and second signals substantially reduce the dependence of so generated edge signal on said spacing variation.

2. The system of claim 1, wherein said difference has a first sign when said reflected beam is on a rising edge of the pre-formatted mark and a second sign opposite to the first sign when said reflected beam is on a failing edge.

3. The system of claim 1, wherein said first and second input elements are symmetric with respect to an axis that is substantially perpendicular to an image of a portion of a respective tracking groove where the optical beam is reflected.

4. The system of claim 1, wherein each input element includes two separate light-sensing areas and the signal from each input element is a sum of quadrant signals from the two separate light-sensing areas.

5. The system of claim 4, wherein said edge detection analyzer includes:

a first summing element coupled to sum two quadrant signals from said first input element;

a second summing element coupled to sum two quadrant signals from said second input element a differential element configured to difference the sums from said first and second summing elements, such that an output of the differential element represents an edge detecting signal; and an edge detection decoder coupled to said differential element to generate an output signal indicating the presence of a pre-formatted mark.

6. The system of claim 1, wherein said first and second signals detect edges of said pre-formatted mark to generate an edge detecting read-only (RO) signal.

7. An optical disk drive system configured to illuminate a storage media of a patterned substrate surface with an optical beam, comprising:

an optical head to couple an optical beam onto a storage media surface at least in part by evanescent waves through an air gap of less than about one wavelength;

a servo detector disposed to receive a reflected beam from the storage media through said optical head and configured to have a plurality of light-sensing segments, each light-sensing segment detecting a different spatial portion of said reflected beam and generating a signal; and an edge detection analyzer operatively coupled to said servo detector and configured to operate on said signals from said plurality of light-sensing segments to generate an edge detection signal to indicate pre-formatted marks according to a spatial difference in energy distribution between two halves across the reflected beam.

8. The system of claim 7, wherein said storage media includes a read-only optical disk, a write-once-read-many disk, or a write-many-read-many disk such as a magneto-optic disk or a phase change media.

9. The system of claim 7, wherein said optical head includes an objective lens and a near-field lens, said near-field lens coupling energy to and from the storage medium.

10. The system of claim 9, wherein said near-field lens is solid-immersion lens with a first surface that is spherical and a second surface that is substantially flat.

11. The system of claim wherein said optical head includes a tapered optical fiber, a solid immersion mirror, or a flying laser that couples optical energy to and from said storage media.

12. The system of claim 7, wherein said edge detection analyzer is configured to receive two input signals of two halves of said reflected beam from two identical light-sensing areas symmetrically arranged relative to each other along a line substantially perpendicular to images of tracking grooves in said reflected beam, wherein a phase distortion caused by said evanescent waves and lens aberrations of said objective lens and said near-field lens is substantially reduced in a difference between said two input signals from said two sensing areas.

13. A method for detecting pre-formatted marks on a storage media the method comprising:

coupling a laser beam onto said storage media through an optical head, wherein an air-gap between said optical head and said storage media is less than one wavelength of said laser beam to obtain a tightly focused beam spot at least in part by evanescent waves;

detecting a reflected beam from said storage media through said optical head by spatially separating said reflected beam separated into segments;

summing said segments into two halves of said reflected beam from two identical light-sensing areas symmetrically arranged relative to each other along a line substantially perpendicular to images of tracking grooves in said reflected beam; and using a difference between signals from the two identical light-sensing areas to indicate an absence or presence of said pre-formatted marks on said storage media and to substantially reduce noise common to the signals from the two light-sensing areas.

14. A method of claim 13, further comprising using the difference to further determine whether said laser beam is reflected by a rising edge or a falling edge of a pre-formatted mark.

* * * * *